US011228879B1

(12) United States Patent
Peterson et al.

(10) Patent No.: US 11,228,879 B1
(45) **Date of Patent: *Jan. 18, 2022**

(54) SYSTEMS AND METHODS FOR LOCATION-BASED ELECTRONIC FINGERPRINT DETECTION

(71) Applicant: Soter Technologies, LLC, Ronkonkoma, NY (US)

(72) Inventors: Derek Peterson, South Setauket, NY (US); Mohammed Elbadry, East Setauket, NY (US)

(73) Assignee: Soter Technologies, LLC, Ronkonkoma, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/159,577

(22) Filed: Jan. 27, 2021

Related U.S. Application Data

(63) Continuation of application No. 16/917,187, filed on Jun. 30, 2020, now Pat. No. 10,932,102.

(51) Int. Cl.
*H04W 4/38* (2018.01)
*H04W 4/029* (2018.01)
(Continued)

(52) U.S. Cl.
CPC ............. *H04W 4/38* (2018.02); *H04W 4/029* (2018.02); *H04W 4/12* (2013.01); *G08B 21/12* (2013.01)

(58) Field of Classification Search
CPC .... G06K 9/00087; H04W 4/38; H04W 4/029; H04W 4/12; G08B 21/12; G08B 3/10;
(Continued)

(56) References Cited

U.S. PATENT DOCUMENTS 3,933,029 A 1/1976 Rabenecker et al.
5,261,596 A 11/1993 Tachibana et al.
(Continued)

FOREIGN PATENT DOCUMENTS

CA 2740454 C 11/2015
KR 101778681 B1 9/2017
(Continued)

OTHER PUBLICATIONS

International Search Report and Written Opinon issued by the U.S. Patent and Trademark Office acting as International Searching Authority in corresponding International Application No. PCT/US18/00223 dated Nov. 15, 2018.
(Continued)

*Primary Examiner* — Stephen G Sherman
(74) *Attorney, Agent, or Firm* — Carter, DeLuca & Farrell LLP; George Likourezos

(57) ABSTRACT

A notification system for location-based fingerprint detection includes a wireless device scanner, at least one sensor, and a remote server. The sensor is configured to sense parameters indicative of an event. The system further includes a processor, and a memory having stored thereon instructions which, when executed by the processor, cause the notification system to: detect an occurrence of the event based on the sensed parameters; receive, by the wireless device scanner, a wireless signal of a user device; determine a unique identifier of the user device based on the wireless signal, wherein the wireless signal includes a wireless signal noise level for the user device; and transmit the determined unique identifier to the remote server.

17 Claims, 5 Drawing Sheets

(51) Int. Cl.
*H04W 4/12* (2009.01)
*G08B 21/12* (2006.01)

(58) Field of Classification Search
CPC . G08B 5/38; G08B 7/06; G06N 20/00; G01N 33/0031; G01N 33/005; A61B 5/4818
See application file for complete search history.

(56) References Cited

U.S. PATENT DOCUMENTS

| | | | | |
|---|---|---|---|---|
| 5,451,929 | A | 9/1995 | Adelman et al. | |
| 5,856,780 | A | 1/1999 | McGeehin | |
| 6,711,470 | B1 | 3/2004 | Hartenstein et al. | |
| 6,998,991 | B1 | 2/2006 | Goldstein et al. | |
| 8,175,297 | B1 | 5/2012 | Ho et al. | |
| 10,262,507 | B2 | 4/2019 | Sloo et al. | |
| 10,559,177 | B2 | 2/2020 | Feldman et al. | |
| 2002/0152792 | A1 | 10/2002 | Wang et al. | |
| 2005/0199735 | A1 | 9/2005 | Eisenhour et al. | |
| 2008/0300817 | A1 | 12/2008 | Bieswanger et al. | |
| 2010/0127865 | A1 | 5/2010 | Marriam et al. | |
| 2013/0255482 | A1 | 10/2013 | Goodson | |
| 2013/0284192 | A1 | 10/2013 | Peleg et al. | |
| 2013/0344888 | A1* | 12/2013 | Dousse | H04W 4/029 455/456.1 |
| 2014/0031067 | A1* | 1/2014 | Kubo | H04W 4/02 455/456.3 |
| 2014/0202787 | A1 | 7/2014 | Richardson et al. | |
| 2014/0260692 | A1 | 9/2014 | Sharp | |
| 2015/0020614 | A1 | 1/2015 | Gettings et al. | |
| 2015/0153171 | A1 | 6/2015 | Zhou et al. | |
| 2015/0235652 | A1 | 8/2015 | Moser | |
| 2015/0241993 | A1 | 8/2015 | Gallo et al. | |
| 2015/0256355 | A1 | 9/2015 | Pera et al. | |
| 2015/0323427 | A1 | 11/2015 | Sharp | |
| 2016/0050037 | A1 | 2/2016 | Webb | |
| 2016/0063841 | A1 | 3/2016 | Schultz et al. | |
| 2016/0102879 | A1 | 4/2016 | Guest et al. | |
| 2016/0163168 | A1 | 6/2016 | Brav et al. | |
| 2016/0212828 | A1 | 7/2016 | Leinen et al. | |
| 2016/0260513 | A1 | 9/2016 | Pan et al. | |
| 2017/0023457 | A1 | 1/2017 | Hart et al. | |
| 2017/0042247 | A1 | 2/2017 | Xiang | |
| 2017/0053507 | A1 | 2/2017 | Hutz | |
| 2017/0055572 | A1 | 3/2017 | Utley et al. | |
| 2017/0227508 | A1 | 8/2017 | Cai et al. | |
| 2017/0284690 | A1 | 10/2017 | Lipanov | |
| 2017/0309091 | A1 | 10/2017 | Cameron et al. | |
| 2017/0321923 | A1 | 11/2017 | Wiens-Kind et al. | |
| 2018/0050230 | A1 | 2/2018 | Toland | |
| 2018/0286208 | A1 | 10/2018 | Baker et al. | |
| 2019/0108739 | A1 | 4/2019 | Wedig et al. | |
| 2020/0011779 | A1 | 1/2020 | Lavrovsky et al. | |
| 2020/0090487 | A1* | 3/2020 | Peterson | G06N 20/00 |

FOREIGN PATENT DOCUMENTS

| | | | | |
|---|---|---|---|---|
| WO | 2019035950 | A1 | 2/2019 | |
| WO | WO-2019035950 | A1 * | 2/2019 | G01N 33/005 |
| WO | 2020005431 | A1 | 1/2020 | |

OTHER PUBLICATIONS

The MagPi Magazine, "Raspberry PI 3: Specs, Benchmarks & Testing," Dec. 31, 2016, retrieved on Apr. 19, 2019 from https://www.raspberrypi.org/magpi/raspberry-pi-3-specs-benchmarks/.

International Search Report and Written Opinion issued by the U.S. Patent and Trademark Office acting as International Searching Authority in International Application No. PCT/US2019/018532 dated May 1, 2019.

International Preliminary Report on Patentability dated Feb. 18, 2020 by the U.S. Patent and Trademark Office acting as International Searching Authority in corresponding International Application No. PCT/US2018/000223.

Office Action issued by the U.S. Patent and Trademark Office dated Jul. 17, 2020 in corresponding U.S. Appl. No. 16/824,347.

Notice of Allowance issued by the U.S. Patent and Trademark Office dated Aug. 3, 2020 in corresponding U.S. Appl. No. 16/812,969.

Office Action issued by the U.S. Patent and Trademark Office dated Apr. 27, 2020 in corresponding U.S. Appl. No. 16/812,969.

Rainer Mautz: "Indoor Positioning Technologies", Habilitation Thesis, Feb. 1, 2012 (Feb. 1, 2012), pp. 1-127, XP055176398, Zurich (CH) Retrieved from the Internet: URL:http://e-collection.library.ethz.ch/eserv/eth:5659/eth-5659-01.

Extended European Search Report, issued by the European Patent Office in connection with International Application No. 21173862.0, dated Oct. 18, 2021.

* cited by examiner

SYSTEMS AND METHODS FOR LOCATION-BASED ELECTRONIC FINGERPRINT DETECTION

CROSS REFERENCE TO RELATED APPLICATION

This application is Continuation of U.S. patent application Ser. No. 16/917,187, filed on Jun. 30, 2020, the entire contents of which are incorporated by reference herein.

TECHNICAL FIELD

The present disclosure relates to a system and method for notifying the detection of vaping, smoking, or potential bullying at an enclosed site. More particularly, the present disclosure relates to system and methods for location-based electronic fingerprint detection and alerts.

BACKGROUND

Vaping, smoking, and bullying are serious public health and societal issues, especially in enclosed areas of academic and business environments due to the hazardous and harmful impact on the health and mental being of not only the actors but on other people. Vaping, smoking, or bullying is also rampant among young aged people and causes many health, mental, and environmental issues. Generally, vaping and smoking have similar effects on people in close proximity to the vapers or smokers. Thus, by identifying vaping or smoking activities in enclosed areas, people can be supervised appropriately so that harmful and hazardous effects can be prevented.

Various methods and systems have been developed to identify or deter bullying, smoking, and vaping in enclosed areas, such as classrooms, restrooms, locker rooms, storage rooms, hospital rooms, or other kinds of enclosed areas in schools, hospitals, warehouses, cafeterias, offices, financial institutes, government buildings, or any other business facility or building. For example, potential bullying, smoking, and vaping can be identified by vape detectors and camera surveillance. However, the latter has not been used in private areas such as restrooms, locker rooms, shower rooms, or hospital rooms because of privacy laws and policies.

Further, when potential bullying, smoking, or vaping is detected, notification systems are needed to notify interested personnel or individuals while not making people related to the potential bullying, smoking, or vaping aware that personnel or individuals have been notified. Thus, developments in efficiently and quickly notifying the occurrence of potential or actual bullying, smoking, or vaping are needed.

SUMMARY

This disclosure relates to systems and methods for location-based electronic fingerprint detection. The system includes a wireless device scanner configured to receive a wireless signal of a user device, at least one sensor configured to sense parameters indicative of at least one of vaping, potential bullying, or smoking, a remote server, a processor, and a memory. The memory includes stored thereon instructions which, when executed by the processor, cause the notification system to detect an occurrence of vaping, potential bullying, or smoking based on the sensed parameters; receive, by the wireless device scanner, the wireless signal of a user device; determine a unique identifier based on the wireless signal; and transmit the determined unique identifier to the remote server.

In an aspect of the present disclosure, the instructions, when executed, may further cause the system to transmit, by the remote server, a notification regarding the unique identifier and the detected occurrence of vaping, potential bullying, or smoking.

In an aspect of the present disclosure, the wireless signal may include at least one of Bluetooth® or Wi-Fi®.

In an aspect of the present disclosure, the unique identifier may include a MAC address. A MAC address is a unique identifier assigned to a network interface controller (NIC) for use as a network address in communications within a network segment. This use is common in most IEEE 802 networking technologies, including Ethernet, Wi-Fi®, and Bluetooth®.

In an aspect of the present disclosure, the notification may include the determined unique identifier, a time of the determining, a wireless signal characteristic, a location of the determined unique identifier, a name of a subscriber for which the user device transmitting the wireless signal is assigned to, and/or an identity of the subscriber to which the user device transmitting the wireless signal is assigned.

In yet another aspect of the present disclosure, the wireless signal characteristic may include a wireless signal strength and/or a wireless signal noise level for the user device.

In a further aspect of the present disclosure, determining the unique identifier may include scanning channels of a wireless network for the unique identifier of the user device within a wireless range of the wireless device scanner.

In yet another aspect of the present disclosure, the notification may include a text message.

In a further aspect of the present disclosure, the instructions, when executed by the processor, may further cause the system to transmit the notification to a predetermined user device.

In accordance with aspects of the present disclosure, a computer-implemented method for location-based electronic fingerprint detection includes detecting an occurrence of vaping, potential bullying, or smoking based on the sensed parameters by at least one sensor; receiving, by a wireless device scanner, a wireless signal; determining a unique identifier based on the wireless signal; and transmitting the determined unique identifier to a remote server.

In yet another aspect of the present disclosure, the method may further include transmitting, by the remote server, a notification regarding the unique identifier and the detected occurrence of vaping, potential bullying, or smoking.

In yet another aspect of the present disclosure, the wireless signal may include Bluetooth® and/or Wi-Fi®.

In a further aspect of the present disclosure, the unique identifier may include a MAC address.

In accordance with aspects of the present disclosure, the notification may include the determined unique identifier, a time of the determining, a wireless signal characteristic, a location of the determined unique identifier, a name of a subscriber for which the user device transmitting the wireless signal is assigned to, and/or an identity of the subscriber to which the user device transmitting the wireless signal is assigned.

In an aspect of the present disclosure, the wireless signal characteristic may include a wireless signal strength and/or a wireless signal noise level for received wireless signal.

In another aspect of the present disclosure, determining the unique identifier may include scanning channels of a wireless network for the unique identifier of the user device within a wireless range of the wireless device scanner.

In yet another aspect of the present disclosure, the notification may include a text message.

In a further aspect of the present disclosure, the method may further include transmitting the notification to a predetermined user device.

In accordance with aspects of the present disclosure, a non-transitory computer-readable medium stores instructions that, when executed by a processor, cause the processor to perform a method which includes: detecting an occurrence of vaping, potential bullying, or smoking based on the sensed parameters by at least one sensor; receiving, by a wireless device scanner, a wireless signal; determining a unique identifier based on the wireless signal; and transmitting the determined unique identifier to a remote server.

In yet another aspect of the present disclosure, the method may further include transmitting, by the remote server, a notification regarding the unique identifier and the detected occurrence of vaping, potential bullying, or smoking.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying figures of which.

DETAILED DESCRIPTION

The present disclosure relates to systems and methods for location-based electronic fingerprint detection. When an alert relating to vaping, smoking, and potential bullying (or other potential commotion or disturbance) are identified, warnings or alerts are transmitted to registered users or clients without providing any indication of warnings to persons who are vaping, smoking, or bullying at the site. In this way, the persons who are bullying, smoking, or vaping can be apprehended, identified, or properly reported and supervised. Further, persons near the vaping or potential bullying can be effectively prevented from potential or further harm. By recording some form of an electronic fingerprint when an alert is transmitted, registered users or clients can trace the alert to the person causing the alerts.

Although the present disclosure will be described in terms of specific embodiments, it will be readily apparent to those skilled in this art that various modifications, rearrangements, and substitutions may be made without departing from the spirit of the present disclosure.

For purposes of promoting an understanding of the principles of the present disclosure, reference will now be made to exemplary embodiments illustrated in the figures, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Figure 1:
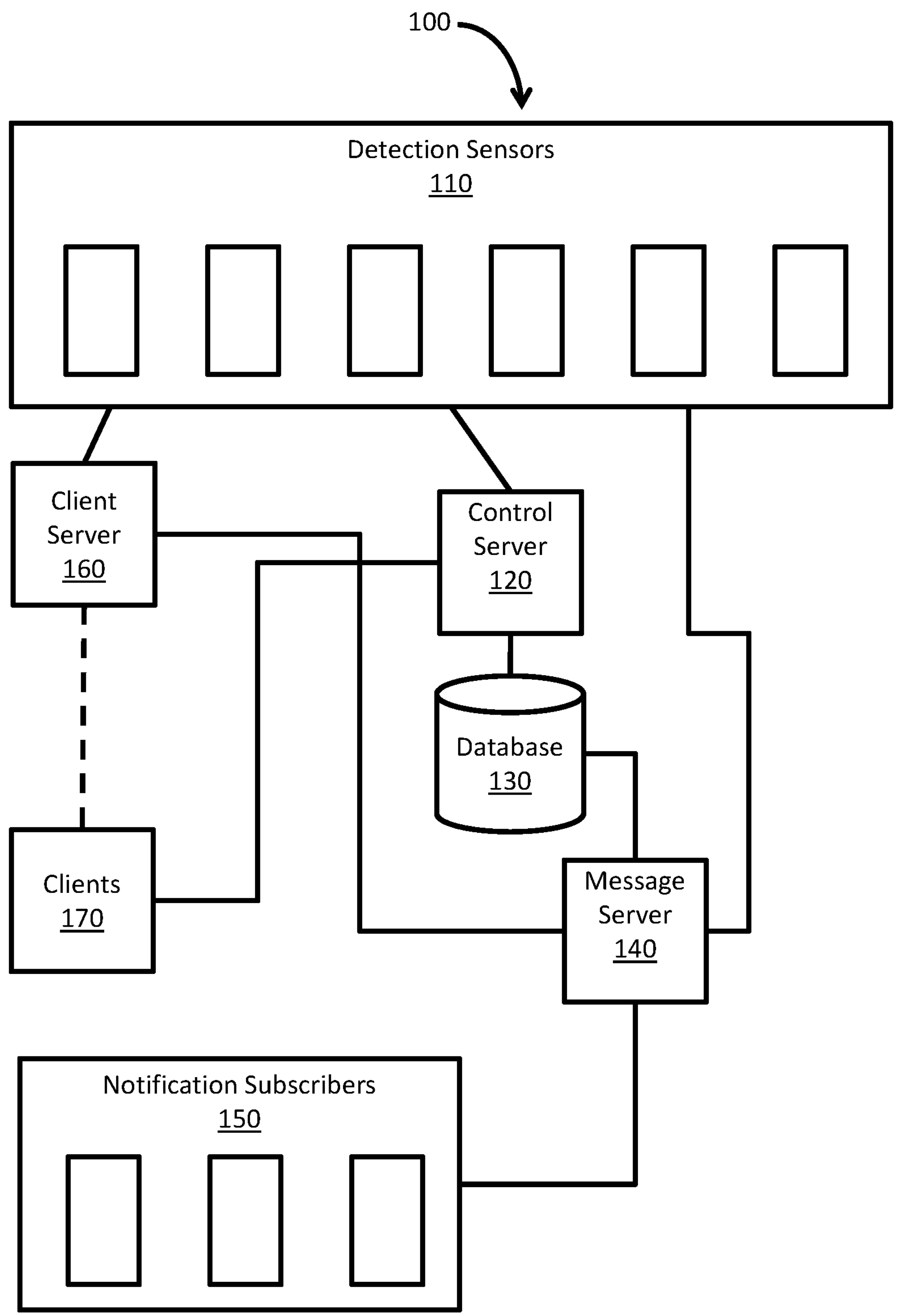
FIG. 1 is a block diagram of a notification system for notifying detection of vaping, smoking, or potential bullying, in accordance with embodiments of the present disclosure.

FIG. 1 illustrates a block diagram showing a notification system 100 according to embodiments of the present disclosure. The notification system 100 includes a plurality of detection sensors 110 which detect air quality related to vaping, sound and/or motion. The notification system 100 further includes a control server 120 for identifying whether or not vaping or potential bullying is occurring at the enclosed site by accessing a database 130 storing base data. The base data includes historical data of detected sounds and air quality at each site when there was no potential bullying or vaping occurring at the site. This historical data may be used for a learning mode. The learning mode is a mode where the system 100 uses data measured by the sensors 110 (and/or historical data) to create a baseline dataset for determining what a site's detected air quality, sound, and/or motion is when there is no vaping, smoking, or bullying. The term "potential bullying" includes anytime a decibel level measured by the sensors 110 is above a predetermined threshold.

The detected air quality may be analyzed by the detection sensors 110 or the detected air quality may be transmitted to the control server 120 together with the detected sound. The control server 120 may analyze the detected sound and air quality by comparing one or both of these parameters with the base data stored at the database 130, and determine whether potential bullying and/or vaping is occurring at the various sites being monitored by the detections sensors 110.

The base data stored at the database 130 may be location-dependent, meaning that the base data for one location is different from the base data for another site or location. The location-dependent base data may be sound data related to identifying potential bullying. For example, in a bathroom, there are flushing sounds, conversations, cleaning sounds, etc. Based on the size of the bathroom and the installation location of the detection sensor 110, the detection sensor 110 may detect sounds differently from other detection sensors 110 installed at the bathroom, or at a bedroom near the bathroom (e.g., a hotel room). Thus, the location-dependent base data may be different based on the installation locations even within the same site (e.g., hotel).

Figure 2:
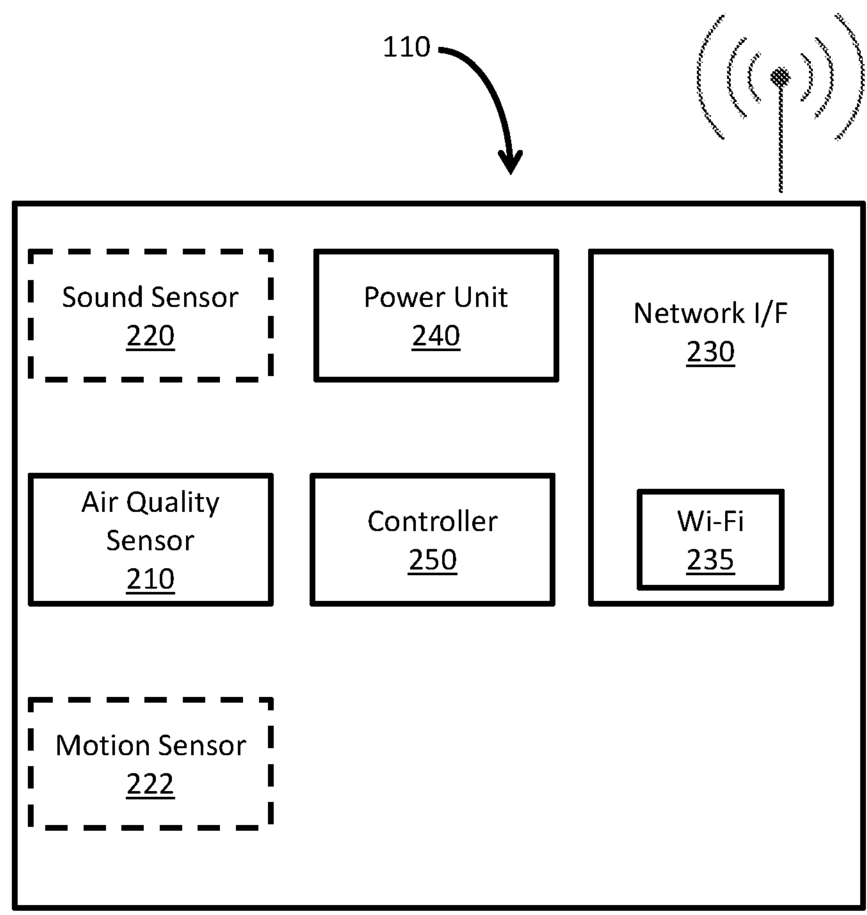
FIG. 2 is a functional block diagram of the detection sensor of FIG. 1 in accordance with embodiments of the present disclosure.

Now referring to FIG. 2, a functional block diagram of the detection sensor 110 of FIG. 1 is shown in accordance with embodiments of the present disclosure. The detection sensor 110 may include a sound sensor 210, an air quality sensor 220, a motion sensor 222, a network interface 230, a power unit 240, and a controller 250. The sound sensor 210 may be used for detecting sound, and the air quality sensor 220, such as a volatile organic compound (VOC) sensor, may be used for detecting air quality. The motion sensor may be used for detecting motion. In particular, the sound sensor 210 detects sound levels (e.g., decibel (dB)) in the environment.

As described above, the threshold value for identifying potential bullying depends on the installation location at the site and based on historical data obtained during the learning mode. Since the detection sensor 110 may cover a limited area, several detection sensors 110 may be installed at one enclosed space when the area of the enclosed space is greater than the area each detection sensor 110 can cover. For example, the detection sensor 110 may cover an area of 10 by 10 square feet. In this situation, each detection sensor 110 may have a different threshold value for identifying potential bullying due to different installation locations at the same location, e.g., a large locker room with lockers, showers, and bathroom stalls. The air quality sensor 220 may detect air quality, including moisture and hydrogen content in the air, and temperature of the air. In other words, the air quality sensor 220 may include a combination of sensors sensing various parameters of the ambient air.

In an aspect, the air quality sensor 220 may include other sensors, such as sensors for sensing the air content of the environment, e.g., the nitrogen or oxygen levels of the ambient air. Vaping may be detected by detection sensors 110 by a specific range combination of humidity, hydrogen, temperature, total volatile organic compound (TVOC), particulate concentration, and/or particulate mass, and/or by detecting VOCs using VOCs sensors/monitors, e.g., a signature. Further, predetermined ranges of carbon monoxide, carbon dioxide, nitrogen dioxide, and/or ammonia may also be included in the signature. Furthermore, the signature may be based on total volatile organic compound (TVOC) sensed by one or more VOCs sensors. Since the signature does not depend on installation locations and times, internal parameters for identifying vaping may be predetermined. In other words, the air quality sensor 220 may not need training, while the sound sensor 210 needs training. In various embodiments, the air quality sensor 220 may need to be trained to detect vaping since the humidity, temperature, hydrogen, total volatile organic compound, particulate concentration, and particulate mass ranges may differ from location to location, or even within the same general location (e.g., a locker room).

The motion sensor 222 is configured to detect moving objects, such as people, in the vicinity of the detection sensor 110. In various embodiments, the motion sensor 222 may be remote from the detection sensor 110. The motion detector may include an optical, microwave, passive infrared, ultrasonic, and/or acoustic sensor, and in many cases, a transmitter for illumination.

The network interface 230 may be configured to transmit sensed results to the control server 120. In an aspect, the network interface 230 may transmit a request send an alert, when potential bullying or vaping is identified, to the message server 140 and the client-server 160. Further, the network interface 230 may receive a command to update internal settings or parameters from the control server 120.

In an aspect, the network interface 230 may communicate with the control server 102 wirelessly or via a wired connection. Wireless connections may be a wide area network (WAN), local area network (LAN), personal area network (PAN), ad hoc network, cellular network, etc. The wired network may utilize category 5 cable (CAT5), CAT5E, category 6 cable (CAT6), or similar cables. Updates for the detection sensor 110 may be wirelessly transmitted through the network interface 230 over the air. Further, through the network interface 230, the client 170 or an operator/manager/technician may be able to turn on and off the detection sensors 110 individually.

The network interface 230 may include a Wi-Fi® transceiver 235 configured to communicate with devices over a Wi-Fi® standard such as IEEE 802 and variations thereof. The Wi-Fi® transceiver 235 may be configured to communicate with mobile devices and/or other Internet of Things (IoT) wireless devices. A mobile device (or handheld computer) is a computer small enough to hold and operate in the hand (e.g., a mobile phone and/or a tablet). Typically, any handheld computer device will have an LCD or OLED flat screen interface, providing a touchscreen interface with digital buttons and keyboard or physical buttons along with a physical keyboard. Many such devices can connect to the Internet and interconnect with other devices such as car entertainment systems or headsets via Wi-Fi®, Bluetooth®, cellular networks, or near field communication. The Internet of Things is a system of interrelated computing devices, mechanical and digital machines, objects, or people that are provided with unique identifiers (e.g., a media access control address (MAC)) and the ability to transfer data over a network without requiring human-to-human or human-to-computer interaction.

The Wi-Fi® transceiver 235 may scan Wi-Fi® channels for MAC addresses of devices within range of the Wi-Fi® transceiver 235. For example, the Wi-Fi® transceiver 235 may find a device on Wi-Fi® channel 11. The Wi-Fi® transceiver 235 may detect the MAC address of a nearby device that is within the Wi-Fi® range of the detection sensor 110. In various embodiments, the wireless transceiver may detect a device identifier (for example, a device name) of the nearby device that is within the wireless range of the detection sensor 110. In various embodiments, it is contemplated that the detection sensor 110 may include a Bluetooth® transceiver configured to scan for Bluetooth® devices within range of the Bluetooth® transceiver. The Bluetooth® transceiver may then detect the MAC address of any nearby device that is within the Bluetooth® range of the detection sensor 110. Bluetooth® is a wireless technology standard used for exchanging data between fixed and mobile devices over short distances using short-wavelength UHF radio waves in the industrial, scientific and medical radio bands, from about 2.400 GHz to about 2.485 GHz, and building personal area networks. It is contemplated that for determining the nearest mobile device, Bluetooth® may be used.

It is contemplated that the systems and methods of the present disclosure may be applied to any wireless communication protocol and unique device identifier and are not limited to Wi-Fi® or Bluetooth®.

The sound sensor 210, the air quality sensor 220, and the network interface 230 may be powered by the power unit 240. Regular batteries may be installed to supply power to the detection sensor 110. For example, AA, AAA, or other suitable batteries may be used. The power unit 240 may utilize batteries and a connection to a power outlet, in order that the power unit 240 may supply power by using the batteries when the electrical grid or microgrid is down.

In an aspect, the power unit 240 may receive power supplied from a network cable, such as CAT5 or CAT6, which is called Power-over-Ethernet (PoE) or active Ethernet. PoE+ and 4PPoE may also be used to supply power. The PoE and PoE+ follow standards (e.g., 802.3at and 802.8bt) set by the Institute of Electrical and Electronics Engineers (IEEE), providing about 30 watts. As next-generation standards for the PoE can provide more power, for example, 60 watts, the ethernet cable can provide sufficient power for the power unit 240. Since the network cable supplies power, the detection sensor 110 may be installed everywhere, the network cable can be installed without worrying about a distance to a power outlet. Also, since the power unit 240 does not need electric components necessary for connections to a power outlet, manufacturing cost can be lowered, and the size of the detection sensor 110 can be reduced.

The detection sensor 110 further includes the controller 250, which controls functions and settings of the detection sensor 110. When the detection sensor 110 is powered, the controller 250 sets settings of the detection sensor 110 and internal parameters of the sound sensor 210 and the air quality sensor 220. The controller 250 further controls the network interface 230 to transmit detected results or requests for sending alerts when potential bullying, smoking, or vaping is detected, and reset or update settings and internal parameters upon reception of an update command from the control server 120.

The controller 250 may be implemented on Linux, Windows, Android, IOS, or similar software operating system. In an aspect, the controller 250 may be implemented on a hardware system, such as a digital signal processor (DSP), application-specific integrated circuit (ASIC), field-programmable gate array (FPGA), different types of programmable read-only memory (e.g., PROM, EPROM, EEPROM, etc.), or microprocessor such as Raspberry Pi.

In an aspect, the controller 250 may be implemented on a hardware system by removing unnecessary features from the hardware system to reduce power consumption and integrating necessary features for identification into the hardware system. For example, the controller 250 may be implemented on a Raspberry Pi in a low power mode by removing unnecessary features, which were already equipped in the Raspberry Pi, and by integrating features for identifying vaping, smoking, and potential bullying. In this way, the power required for running the sound sensor 210, the air quality sensor 220, the network interface 230, and the controller 250 can be sufficiently supplied via a network cable (e.g., PoE, PoE+ and 4PPoE). This approach for reducing power consumption may be applied to other hardware systems or software operating systems.

For example, a standard processor of Raspberry Pi (e.g., Model 3, 3B, 3B+, etc.) runs at 1.4 GHz. By editing operating system configuration files, the Raspberry Pi processor can run at less than 1.4 GHz. Thus, the consumption of power is lowered, meaning that the Raspberry Pi processor runs in the low power mode. Further, the Raspberry Pi includes an HDMI port for debugging and diagnostic purposes. When plugging into the HDMI port, a user can change and debug the operating system configuration files. The disclosed embodiments are exemplary, and other implementations are contemplated. For example, the hardware system need not be a Raspberry Pi and can be another hardware/software system that includes a processor, memory, communication interfaces, an operating system, power management, and one or more software applications. The communication interfaces can include, for example, Ethernet, Wi-Fi®, USB, and/or HDMI, among others. In various embodiments, the hardware/software system can include a low power mode, which permits the system to be powered by Power over Ethernet (PoE). The low power mode can include, for example, setting the processor to decreased processing capability. Other variations are contemplated.

In an aspect, the detection sensor 110 may not be equipped with a warning system. Thus, when potential bullying or vaping is detected at the installation site, any person who bullies or vapes cannot recognize that the identification of such is reported to the client 170 and the notification subscribers 150 because the identification is reported discreetly or silently to the person.

In another aspect, the detection sensor 110 may save the base data in a memory 111 of the detection sensor 110. In other words, the detection sensor 110 may determine vaping, potential bullying, or smoking by itself at the site where the detection sensor 110 is installed. In this case, the detection sensor 110 transmits signals indicating abnormality matching the signature of vaping, bully, or smoking. This ensures data privacy, meaning that the data stay within the detection sensor 110 and further ensures the privacy of people at the site.

In an aspect, the base data may be location-independent, meaning that the base data is the same for every enclosed location at every time. The location-independent base data may be air quality data related to identifying vaping. Since vaping has a signature in temperature, humidity, and hydrogen ranges, vaping may be identified based on the signature. In an aspect, features for identifying vaping may be integrated into the detection sensor 110 in order that the detection sensor 110 may request an alert or warning message to be sent to the client 170, when the signature is identified in the detected air quality. The signature may include a combination of predetermined ranges of temperature, humidity, and hydrogen.

Generally, hydrogen sensors require at least 7 volts and about 1,000-ohm resistance. The detection sensor 110, however, may have a modified hydrogen sensor, which requires much lower voltage and much higher resistance. The voltage and resistance may vary based on the temperature of the environment.

The database 130 may further include historical data, which is time-series and location-specific data for identifying potential bullying for each location where the detection sensor 110 has been installed. In an aspect, the control server 120 may analyze the historical data to predict occurrences of vaping and potential bullying at the location so that appropriate actions may be proactively and expeditiously be taken at the location.

In an aspect, the control server 120 may analyze the historical data stored at the database 130 to identify the trend of the history data. The trend may be a decrease or increase pattern of occurrences of vaping or potential bullying. In case a decrease or increase pattern is identified, the control server 120 may adjust the base data for identifying potential bullying to make the detection sensor 110 more or less sensitive to the identification. In this way, the base data may be adjusted based on the trend of the historical data.

For these reasons, the location-dependent base data is to be obtained at the site for a period in a learning mode. The period may vary depending on the installation location, the time, the day of the week, and the date. The location-dependent base data may be obtained for a period, which is determined based on the environment of the enclosed site and the installation location of the detection sensor 110.

After obtaining location-dependent base data for a period sufficiently long enough to form a profile for the location, the detection sensor 110 may be turned into an active mode to identify noise disturbance.

In an aspect, when the detection sensor 110 transmits detected results to the control server 120, the control server 120 may acquire from the database 130 the profile for the location where the detection sensor 110 is installed and the time when the detected results are obtained and analyzes the detected results to identify occurrence of potential bullying based on the base data.

Figure 3:
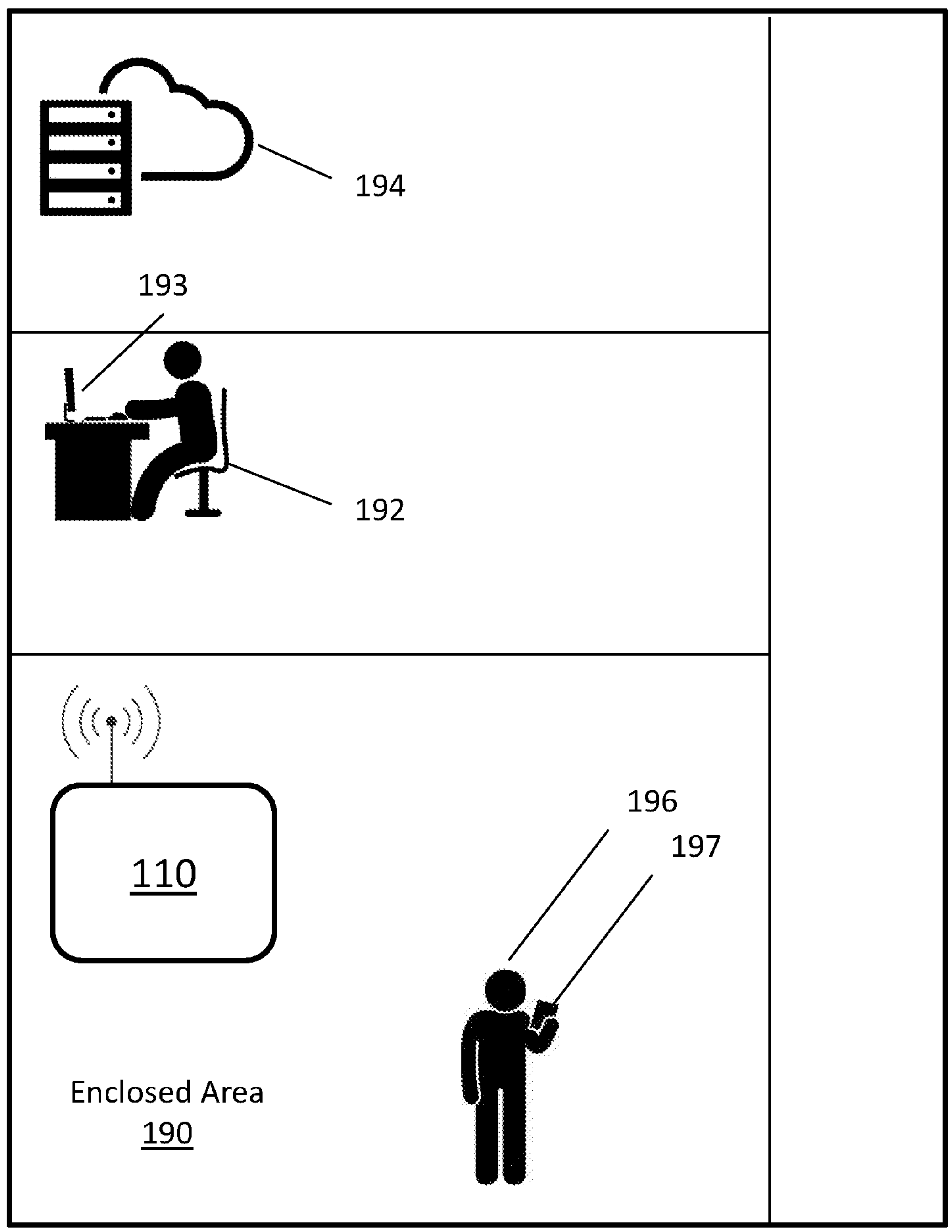
FIG. 3 is a conceptual diagram of the system of FIG. 1 in use in accordance with embodiments of the present disclosure.

With reference to FIG. 3, a conceptual diagram is shown of the system of FIG. 1 in use. For example, a student 196 may enter an enclosed area 190, such as a bathroom, where the detection sensor 110 is located. During active mode, the detection sensor 110 may detect air quality related to vaping, detect sound, and/or detect motion-related to a noise disturbance at the enclosed area 190. The detection sensor 110 (FIG. 2) then transmits the detected results to the control server 120 (FIG. 1). The control server 120 may acquire from the database 130 the profile for the location where the detection sensor 110 is installed and the time when the detected results are obtained, and analyzes the detected results, for example, to identify the occurrence of potential bullying or vaping based on the base data.

Next, the detection sensor 110 scans one or more channels of the wireless network and determines an electronic "fingerprint" of any user mobile devices 197 within the wireless range of the detection sensor 110. The wireless fingerprint may be based on a wireless signal characteristic (e.g., signal strength, and/or signal noise) of a mobile device (or other IoT wireless device).

Next, the detection sensor 110 may request an alert or warning message to be sent to a remote server 194 or a predetermined user device 193.

Figure 4:
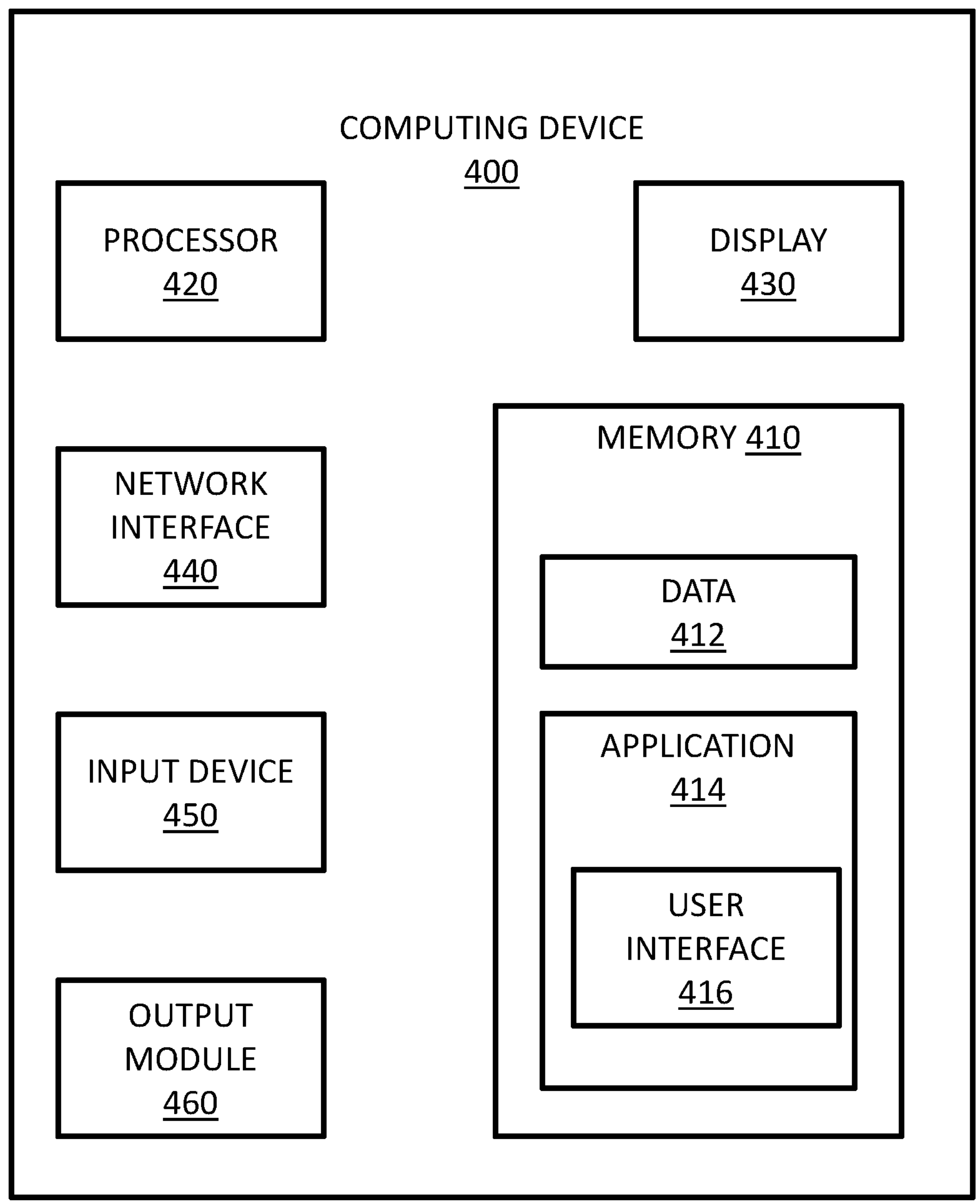
FIG. 4 is a functional block diagram of a computing device in accordance with embodiments of the present disclosure.

Turning now to FIG. 4, a simplified block diagram is provided for a computing device 400, which can be implemented as the control server 120, the database 130, the message server 140, and the client-server 160 of FIG. 1. The computing device 400 may include a memory 410, a processor 420, a display 430, a network interface 440, an input device 450, and/or an output module 460. The memory 410 includes any non-transitory computer-readable storage media for storing data and/or software that is executable by the processor 420 and which controls the operation of the computing device 400.

In an aspect, the memory 410 may include one or more solid-state storage devices such as flash memory chips. Alternatively, or in addition to the one or more solid-state storage devices, the memory 410 may include one or more computer-readable storage media/devices connected to the processor 420 through a mass storage controller (not shown) and a communications bus (not shown). Although the description of computer-readable media contained herein refers to solid-state storage, it should be appreciated by those skilled in the art that computer-readable storage media can be any media that can be accessed by the processor 420. That is, computer-readable storage media may include non-transitory, volatile and/or non-volatile, removable and/or non-removable media implemented in any method or technology for storage of information such as computer-readable instructions, data structures, program modules, and/or other data. For example, computer-readable storage media includes RAM, ROM, EPROM, EEPROM, flash memory or other solid-state memory technology, CD-ROM, DVD, Blu-Ray or other optical storage, magnetic cassettes, magnetic tape, magnetic disk storage or other magnetic storage devices, or any other medium which can be used to store the desired information and which can be accessed by the computing device 400.

The memory 410 may store application 414 and/or data 412 (e.g., base data and historical data from the motion sensor 222, the sound sensor 210, and/or the air quality sensor 220 of FIG. 2). The application 414 may, when executed by processor 420, cause the display 430 to present the user interface 416. The processor 420 may be a general-purpose processor, a specialized graphics processing unit (GPU) configured to perform specific graphics processing tasks while freeing up the general-purpose processor to perform other tasks, and/or any number or combination of such processors. The display 430 may be touch-sensitive and/or voice-activated, enabling the display 430 to serve as both an input and output device. Alternatively, a keyboard (not shown), mouse (not shown), or other data input devices may be employed. The network interface 440 may be configured to connect to a network such as a local area network (LAN) consisting of a wired network and/or a wireless network, a wide area network (WAN), a wireless mobile network, a Bluetooth® network, and/or the Internet.

For example, the computing device 400 may receive, through the network interface 440, detection results for the detection sensor 110 of FIG. 1, for example, detected sound in the learning mode and the active mode, and historical data, which is time-series data including detected sounds and detected air quality from the detection sensor 110 for the whole running times or a predetermined period. The computing device 400 may receive updates to its software, for example, the application 414, via the network interface 440. It is contemplated that updates may include "over-the-air" updates. The computing device 400 may also display notifications on the display 430 that a software update is available.

The input device 450 may be any device by which a user may interact with the computing device 400, such as, for example, a mouse, keyboard, foot pedal, touch screen, and/or voice interface. The output module 460 may include any connectivity port or bus, such as, for example, parallel ports, serial ports, universal serial buses (USB), or any other similar connectivity port known to those skilled in the art. The application 414 may be one or more software programs stored in the memory 410 and executed by the processor 420 of the computing device 400. The application 414 may be installed directly on the computing device 400 or via the network interface 440. The application 414 may run natively on the computing device 400, as a web-based application, or any other format known to those skilled in the art.

In an aspect, the application 414 will be a single software program having the features and functionality described in the present disclosure. In other aspects, the application 414 may be two or more distinct software programs providing various parts of these features and functionality. Various software programs forming part of the application 414 may be enabled to communicate with each other and/or import and export various settings and parameters relating to the identification of potential bullying, smoking, and vaping.

The application 414 communicates with a user interface 416, which generates a user interface for presenting visual interactive features to the notification subscribers 150 or the client 170 of FIG. 1 on the display 430. For example, the user interface 416 may generate a graphical user interface (GUI) and output the GUI to the display 430 to present graphical illustrations.

Figure 5:
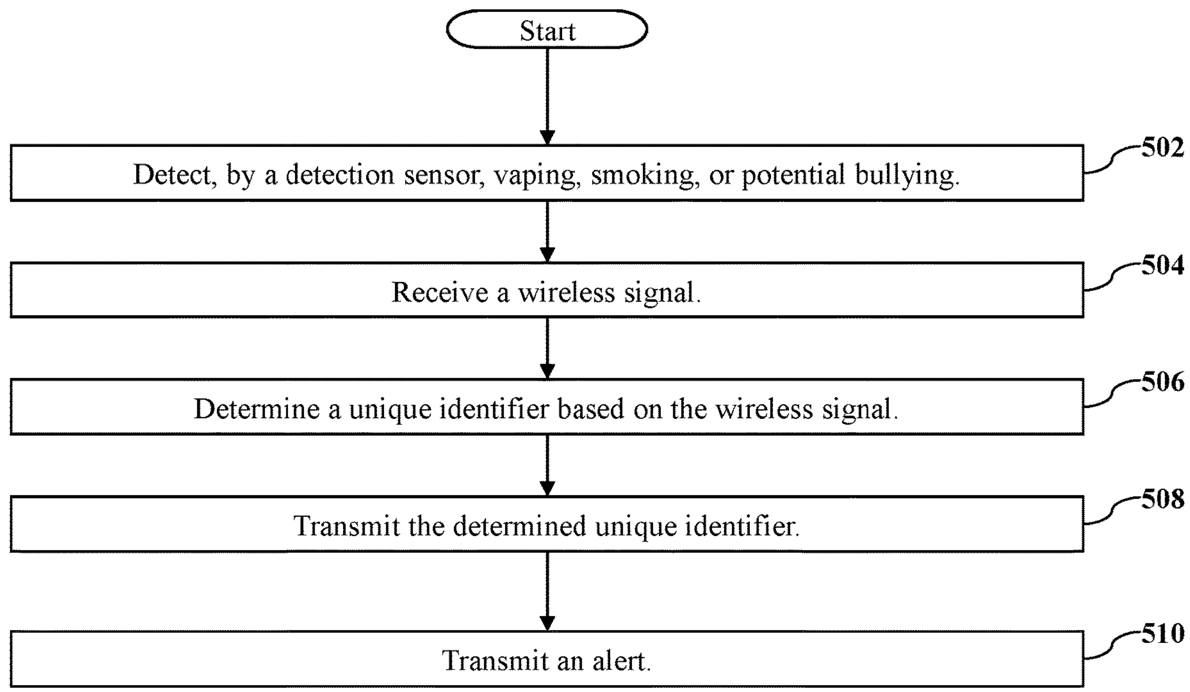
FIG. 5 is a flowchart showing a method for location-based electronic fingerprint detection in accordance with embodiments of the present disclosure.

Now turning to FIG. 5, a method 500 is provided for location-based electronic fingerprint detection in accordance with embodiments of the present disclosure. An electronic fingerprint can be understood to include an electronic signal signature of a device. Initially, at step 502, the method detects, by detection by a sensor 110 indicative occurrence of vaping, potential bullying, and/or smoking (e.g., sensing motion, sound, air quality, and/or temperature). For example, there may be vaping, smoking, or potential bullying in the enclosed area and the sensor may detect the sound of potential bullying in an enclosed area.

When an occurrence of vaping, smoking, and/or potential bullying is detected/sensed in step 502, next, at step 504, the wireless device scanner receives a wireless signal within a wireless range. One or more of the channels of a wireless network within the wireless range of the wireless device scanner may be scanned.

At step 506, the method determines a unique identifier based on the wireless signal. The unique identifier may be determined based on a wireless signal characteristic (e.g., signal strength and/or signal noise). Wi-Fi® uses the 802.11 standard and variations thereof. The 802.11 standard provides several distinct radio frequency ranges for use in Wi-Fi® communications, such as: 900 MHz, 2.4 GHz, 5 GHz, 5.9 GHz, and 60 GHz bands. Each range is divided into a multitude of channels. Channels can be shared between networks, but only one transmitter can locally transmit on a channel at any moment in time. A Wi-Fi® signal may occupy more than one channel at a time.

The controller may scan channels of a wireless network (e.g., a Bluetooth® or a Wi-Fi® network) for a media access control address (MAC address) of a device that is within a wireless range of the wireless transceiver. For example, the user may have a mobile computing device such as a phone or a tablet, which has Wi-Fi®. The controller may determine that the user's phone is on Wi-Fi® channel 11 and determine the MAC address of the user's phone as the unique identifier. For example, the determined MAC address may be "12 34 56 78 9A BC."

As persons skilled in the art will understand, a MAC address is a unique identifier assigned to wireless and wireline communication devices. MAC addresses are commonly used in IEEE 802 networking technologies, including Ethernet, Wi-Fi®, and Bluetooth®. Within the Open Systems Interconnection (OSI) network model, MAC addresses are used in the medium access control protocol sublayer of the data link layer. As typically represented, MAC addresses are recognizable as six groups of two hexadecimal digits, separated by hyphens, colons, or without a separator. MAC addresses are primarily assigned by device manufacturers and are therefore often referred to as the burned-in address or as an Ethernet hardware address, hardware address, and/or physical address. Each address can be stored in hardware, such as the network transceiver's read-only memory, or by a firmware mechanism.

In various embodiments, the wireless signal characteristic may include the wireless signal strength and/or a wireless signal noise level for the device within a wireless range of the wireless transceiver. For example, the controller may use tools, such as iwconfig, to find wireless access points and display statistics and wireless signal characteristics of the access point's wireless operation. For example, the interface name, frequency, Tx power, signal level, bit rate, noise level, and/or SSID (Service Set ID). For example, the controller may determine that the SSID may be "Mr. Smith's device." It may have a Tx power of 20 dBm, a signal level of −39 dBm, and a noise level of −87 dBm.

At step 508, the method transmits the determined unique identifier to a remote server. For example, the MAC address, "12 34 56 78 9A BC," may correspond to a Wi-Fi® transceiver in a cell phone within the wireless range of the transceiver.

At step 510, the method sends an alert notification. In various embodiments, the alert may be sent from the remote server. The alert may be sent to a predetermined user device. The alert may be, for example, an email, a text message, or a multimedia message, among other things. The contact information for such device may be stored in the memory 111 of the detection sensor and/or can be stored in the database 130 or in one or more servers shown in FIG. 1. The message may be sent by the detection sensor 110 or sent by one or more servers shown in FIG. 1, such as the client server 160 or the message server 140. In various embodiments, the alert notification includes at least one of a location of the detection sensor 110, a time of the detection of the sensed occurrence, a unique identifier, a name of a subscriber for which the user device transmitting the wireless signal is assigned to, and/or an identity of the subscriber for which the user device transmitting the wireless signal is assigned to. For example, Mr. Jones's cell phone may be a predetermined user device 192 (FIG. 3). The detection location may not be a specific location of the detection sensor 110, which detects vaping, smoking, or potential bullying, but instead, a location of the zone, to which the detection sensor belongs. The alert may not be sent to the location of the detection, meaning that persons in the detection location are unable to know that the alert is sent to the responsible person. In this way, vaping, smoking, or potential bullying can be appropriately responded to while the persons doing such activity are not aware of the transmission of the alert. In various embodiments, the alert includes at least one of a location of the detection sensor 110, or a time of the detection of the sensed parameter.

For example, the remote server may transmit the alert to Mr. Jones's phone that MAC address "12 34 56 78 9A BC" was detected near the remote sensing device at or about the same time that a sound was sensed indicating potential bullying. Thus, providing the opportunity for Mr. Jones to trace the alert to the person causing the alert(s).

The method of FIG. 5 is exemplary, and variations are contemplated to be within the scope of the present disclosure.

For example, the Wi-Fi® device scanner may be a wireless device scanner for another wireless standard/protocol, such as Bluetooth® or ZigBee®, among other things, and may generally be a wireless device scanner. Additionally, addresses other than MAC addresses are contemplated to be within the scope of the present disclosure. For example, in various embodiments, a user device may be identified by user designated identifier, such as "My Smartphone" or other user-designated identifier.

Accordingly, any of the embodiments and aspects described herein with regard to Wi-Fi® are also applicable to other wireless standards and protocols, and any of the embodiments and aspects described herein with respect to MAC address are also applicable to other types of device identifiers, wireless identifiers, or networking identifiers. Such applications are contemplated to be within the scope of the present disclosure.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages that are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached figures are presented only to demonstrate certain examples of the disclosure. Other elements, steps, methods, and techniques that are insubstantially different from those described above and/or in the appended claims are also intended to be within the scope of the disclosure.

What is claimed is:

1. A notification system for location-based fingerprint detection comprising:
- a wireless device scanner;
- at least one sensor configured to sense parameters indicative of at least one of vaping, potential bullying, or smoking;
- a processor; and
- a memory having stored thereon instructions which, when executed by the processor, cause the notification system to:
  - detect an occurrence of the at least one of vaping, potential bullying, or smoking, based on the sensed parameters;
  - receive, by the wireless device scanner, a wireless signal of a user device;
  - determine a unique identifier of the user device based on the wireless signal, wherein the wireless signal includes a wireless signal noise level for the user device; and
  - transmit a notification regarding the unique identifier and the detected at least one of vaping, potential bullying, or smoking, based on the determined unique identifier.

2. The notification system of claim 1, wherein the wireless signal includes at least one of Bluetooth or Wi-Fi.

3. The notification system of claim 1, wherein the unique identifier includes a MAC address.

4. The notification system of claim 1, wherein the notification includes at least one of: the determined unique identifier, a time of the determining, or a location of the determined unique identifier.

5. The notification system of claim 4, wherein the wireless signal characteristic includes a wireless signal strength for the user device.

6. The notification system of claim 1, wherein determining the unique identifier includes scanning channels of a wireless network for the unique identifier of the user device within a wireless range of the wireless device scanner.

7. The notification system of claim 1, wherein the notification includes a text message.

8. The notification system of claim 1, wherein the instructions, when executed by the processor, further cause the system to transmit the notification to a predetermined user device.

9. A computer-implemented method for location-based fingerprint detection comprising:
- detecting an occurrence of at least one of vaping, potential bullying, or smoking, based on a sensed parameters by at least one sensor;
- receiving, by a wireless device scanner, a wireless signal of a user device;
- determining a unique identifier of the user device based on the wireless signal, wherein the wireless signal includes a wireless signal noise level for the user device; and
- transmitting a notification regarding the unique identifier and the detected at least one of vaping, potential bullying, or smoking, based on the determined unique identifier.

10. The computer-implemented method of claim 9, wherein the wireless signal includes at least one of Bluetooth or Wi-Fi.

11. The computer-implemented method of claim 9, wherein the unique identifier includes a MAC address.

12. The computer-implemented method of claim 11, further comprising transmitting the notification to a predetermined user device.

13. The computer-implemented method of claim 9, wherein the notification includes at least one of: the determined unique identifier, a time of the determining, a location of the determined unique identifier, a name of a subscriber to which the user device transmitting the wireless signal is assigned to, or an identity of the subscriber for which the user device transmitting the wireless signal is assigned.

14. The computer-implemented method of claim 13, wherein the wireless signal characteristic includes at least one of a wireless signal strength or a wireless signal noise level for the user device.

15. The computer-implemented method of claim 9, wherein determining the unique identifier includes scanning channels of a wireless network for the unique identifier of the user device within a wireless range of the wireless device scanner.

16. The computer-implemented method of claim 9, wherein the notification includes a text message.

17. A non-transitory computer-readable medium storing instructions that, when executed by a processor, cause the processor to perform a method comprising:
- detecting an occurrence of at least one of vaping, potential bullying, or smoking, based on a sensed parameters by at least one sensor;
- receiving, by a wireless device scanner, a wireless signal of a user device;

determining a unique identifier of the user device based on the wireless signal, wherein the wireless signal includes a wireless signal noise level for the user device; and transmitting a notification regarding the unique identifier and the detected at least one of vaping, potential bullying, or smoking, based on the determined unique identifier.

* * * * *